Jan. 23, 1934. G. A. CROWTHER 1,944,595
LOCK NUT
Filed June 29, 1932

INVENTOR
GEORGE A. CROWTHER
BY R C Hopgood
ATTORNEY

Patented Jan. 23, 1934

1,944,595

UNITED STATES PATENT OFFICE 1,944,595

LOCK NUT

George A. Crowther, Jackson Heights, N. Y., assignor to International Safety Lock Nut Corporation, New York, N. Y., a corporation of Delaware Application June 29, 1932. Serial No. 619,889

6 Claims. (Cl. 151—19)

My invention relates to improvements in lock nut assembly and is adapted for use with vehicle wheels such as are used on automobiles, auto trucks and the like, and is particularly adapted for use with disc type wheels.

Difficulty has heretofore been experienced in mounting disc type wheels, due to the wheel nuts becoming unloosened and falling off or imperfect seating of the wheel nuts with the disc. The hole in the wheel through which the bolt passes in time wears egg-shaped, thus rendering the wheel unfit for further service. The lock nut arrangement according to my invention avoids the foregoing difficulties.

My arrangement comprises a bolt provided with external threads, an internally threaded nut provided with a wedge-shaped groove, and a solid washer having split segments which co-act with the groove in the nut so as to force the segments to grip the threads of the bolt.

The object to be secured, such as a disc wheel, is provided with an opening or hole through which the bolt passes. The nut with the washer facing toward the wheel is then screwed on until the washer, which freely turns in the groove of the nut, engages the surface of the wheel. Further turning of the nut forces the segments to engage the threads of the bolt, due to the pressure applied to the washer by the inclined surface of the wedge-shaped groove in the nut.

Various features of my invention will be noted from the description to follow.

My invention is illustrated in the accompanying drawing, wherein.

Figure 1:
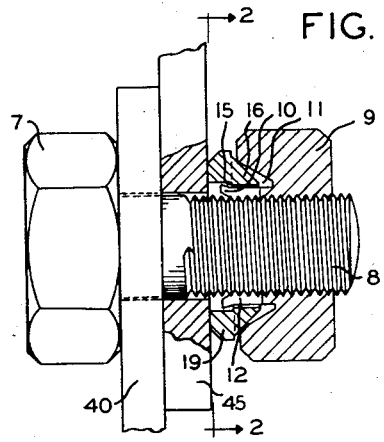
Fig. 1 shows the lock nut assembly, partly in section.
Figure 2:
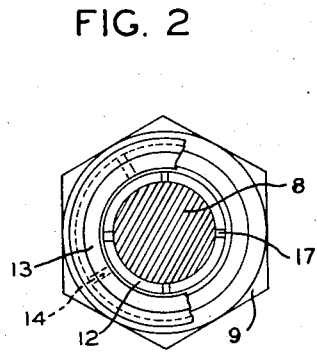
Fig. 2 is a view, partly in section, on line 2—2, of Fig. 1.
Figure 4:
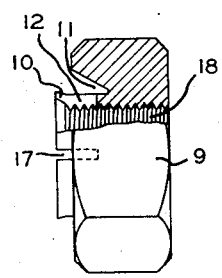
Fig. 4 shows a side view of the nut.

Referring first to Fig. 4, the nut 9 has an internal thread 18 which co-operates with the external thread 8 on bolt 7 (Fig. 1). A wedge-shaped groove 11 is cut in the face of the nut, as shown, which leaves a ring-like structure 12 which is provided with four slots, as 17. These slots divide the ring-like structure into four parts or segments.

As shown, the segmented portion 12 extends beyond the face of the nut. The inner edge of the portion 12 is tapered off at 10 so that a flange can be formed to hold the washer 10 (Fig. 3) in place.

The washer 10 is provided with a tapered or inclined portion 16, which engages the groove 11 in the nut 9. The tapered portion 16 is also provided with four slots 14. In assembling, the washer is slipped over the segmented portion 12 of the nut 9, after which the edge 10 is expanded by a suitable tool until the expanded portion forms a flange which engages or overlaps the edges of the recess 15 in the collar, as shown in Fig. 1. The washer, when in position, can rotate freely around the portion 12, which serves as a bearing, and the flange formed at 10 prevents the washer from falling off.

Parts designated as 40 and 45 may represent a portion of a disc wheel or wheels or other objects to be secured. The parts are provided with openings through which the threaded shank 8 of the bolt passes.

The nut 9, with its attached washer, is turned until the face of the washer engages the surface of 45; during the turning operation there is no pressure exerted upon the segmented portion 12 of the nut. After the face of the washer engages the surface of 45 and the nut tightens, the inclined surface 16 of the washer engages the inclined portion of the groove 11 in nut 9 and forces the segmented portion 12 to grip the threads of the bolt, thus locking the nut and bolt together against displacement.

During the tightening of the nut, the washer, which turns freely upon the portion 12 of the nut, does not rotate to bite into the object or wheel 45 and so protects it against damage.

Figure 3:
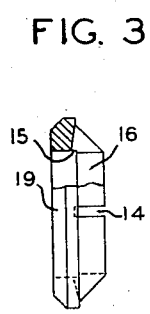
Fig. 3 shows a side view of the washer, partly in section.
Figure 5:
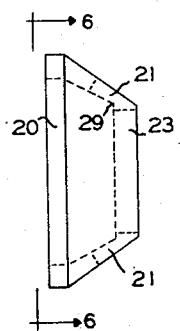
Fig. 5 is a modification of the washer shown in Fig. 3.
Figure 6:
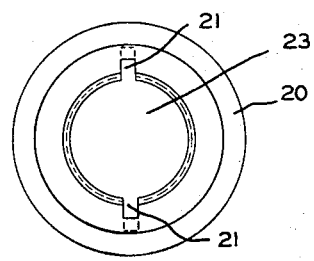
Fig. 6 is a plan view of Fig. 5, on line 6—6.

The washer shown in Figs. 5 and 6 co-operates with nut 9, as does the washer shown in Fig. 3, but, instead of being provided with four slots, it has two at 21. The washer is dish-shaped so as to provide a recess for the reception of a bolt having an enlarged shank portion. There are occasions when the unthreaded portion of the shank is larger in diameter than the threaded portion. In this event, the unthreaded portion should not extend through the opening 23 of the washer. The recess in the washer, in this case, is deep enough and of sufficient diameter to receive the unthreaded or enlarged portion of the bolt and allow the threaded portion to extend through opening 23.

With this arrangement the base 20 of the washer will rest directly upon the surface to be secured.

Various forms of washers may be used in conjunction with the nut to meet different conditions, but their co-operation will be the same.

What is claimed is:

1. The combination of a nut having in the base thereof an annular groove of wedge-shaped cross-section concentric with the axis thereof and a split internally threaded sleeve portion extending below said base, the outer wall of which forms the inner wall of the groove, and a closed annular washer surrounding said sleeve portion, depending therefrom and rotatable thereon, and having a split annular projection which has an inner wall of smaller diameter than the inner wall of the annular washer.

2. The combination of a nut having in the base thereof an annular groove of wedge-shaped cross-section concentric with the axis thereof and a split internally threaded sleeve portion extending below said base, the outer wall of which whilst substantially parallel to the axis of the nut forms the inner wall of the groove, and a closed annular washer surrounding said sleeve portion, depending therefrom and rotatable thereon, and having a split annular projection of wedge-shaped cross-section, said annular projection having an inner wall parallel to the axis of the nut and of smaller diameter than the inner wall of the annular washer.

3. The combination of a nut having in the base thereof an annular groove of wedge-shaped cross-section concentric with the axis thereof and a split internally threaded sleeve portion extending below said base, the outer wall of which forms the inner wall of the groove, a closed annular washer surrounding said sleeve portion, depending therefrom and rotatable thereon, and having a split annular projection which has an inner wall of smaller diameter than the inner wall of the annular washer, the angle of inclination of the outer wall of the groove to the inner wall thereof being less than 45° and less than the angle of inclination of the outer to the inner wall of said annular projection.

4. The combination of a nut having in the base thereof an annular groove of wedge-shaped cross-section concentric with the axis thereof and a split internally threaded sleeve portion extending below said base, the outer wall of which whilst substantially parallel to the axis of the nut forms the inner wall of the groove, a closed annular washer surrounding said sleeve portion, depending therefrom and rotatable thereon, and having a split annular projection of wedge-shaped cross-section, the inner and outer walls of said annular projection extending in a direction inclined toward the axis of said washer and having at the end thereof remote from the washer an inner face substantially parallel to the axis of the nut and considerably less in diameter than the inner wall of the washer, said inner face forming with said outer wall of said projection a split ring of wedge-shaped cross section co-operating with the groove of the nut.

5. The combination of a nut having in the base thereof an annular groove of wedge-shaped cross-section concentric with the axis thereof and a split internally threaded sleeve portion extending below said base, the outer wall of which forms the inner wall of the groove, and an annular washer surrounding said sleeve portion, depending therefrom and rotatable thereon, and having an annular projection of wedge-shaped cross-section extending into said annular groove for engaging the walls thereof.

6. The combination of a nut having in the base thereof an annular groove of wedge-shaped cross-section concentric with the axis thereof and a split internally threaded sleeve portion extending below said base, the outer wall of which forms the inner wall of the groove, and an annular washer surrounding said sleeve portion, depending therefrom and rotatable thereon, a split annular projection of wedge-shaped cross-section for co-operating with said annular groove, said split annular projection having an inner wall of smaller diameter than at least a portion of the inner wall of the annular washer.

GEORGE A. CROWTHER.